United States Patent [19]

Kawai et al.

[11] Patent Number: 5,157,511
[45] Date of Patent: Oct. 20, 1992

[54] IMAGE CONTROL APPARATUS FOR PROVIDING AN INDEX NUMBER TO A VIDEO REPRODUCER TO CAUSE THE REPRODUCER TO SEARCH FOR AND TO REPRODUCE A PRESELECTED STILL IMAGE

[75] Inventors: Toshihiko Kawai, Tokyo; Keisuke Ohmori; Mitsuru Tanabe, both of Kanagawa, all of Japan

[73] Assignee: Sony Corporation, Tokyo, Japan

[21] Appl. No.: 558,213

[22] Filed: Jul. 24, 1990

[30] Foreign Application Priority Data

Jul. 25, 1989 [JP] Japan ................................. 1-191877

[51] Int. Cl.⁵ .............................................. H04N 5/76
[52] U.S. Cl. .................................. 358/335; 358/342; 358/183; 360/10.1
[58] Field of Search ...................... 358/335, 342, 183; 360/33.1, 35.1, 10.1, 72.2; 369/32

[56] References Cited

U.S. PATENT DOCUMENTS

| | | | |
|---|---|---|---|
| 4,802,019 | 1/1989 | Haraka et al. | 358/335 |
| 5,010,417 | 4/1991 | Yoshio et al. | 358/335 |

FOREIGN PATENT DOCUMENTS

| | | |
|---|---|---|
| 0282997A2 | 9/1988 | European Pat. Off. . |
| 3401678A1 | 7/1984 | Fed. Rep. of Germany . |
| 2136653B | 9/1984 | United Kingdom . |

OTHER PUBLICATIONS

Patent Abstracts of Japan, vol. 11, No. 253 (P-606) Aug. 18, 1987 & JP-A-62 058 374 (Hitachi Medical Corp), Mar. 14, 1987.

Patent Abstracts of Japan, vol. 12, No. 93 (P-680), Mar. 26, 1988 & JP-A-62 226 375 (Ricoh Ltd), Oct. 5, 1987.

Primary Examiner—Roy N. Envall, Jr.
Assistant Examiner—Huy Nguyen
Attorney, Agent, or Firm—Philip M. Shaw, Jr.

[57] ABSTRACT

An image search control apparatus provides an index number to a reproducer having a storage medium on which a plurality of still images constituting a motion picture is stored. Each still image is identified by an index number. The reproducer reproduces and provides as a video signal the plurality of still images constituting the motion picture and the index number of each still image. Alternatively, in response to receiving an index number, the reproducer reproduces and provides as the video signal the still image corresponding to the received index number. The image search control apparatus comprises a selector that receives the video signal from the reproducer and that selects from the still images constituting the motion picture a number of selected still images. An index memory stores each of the selected still images and its index number. A display receives the video signal from the reproducer and also receives a number of selected still images from the index memory. The display displays simultaneously on the same screen a moving or still primary picture in response to the video signal from the reproducer, and a number of secondary pictures, each secondary picture being in response one selected still image. A pointing device chooses one of the secondary pictures. A controller, responsive to the pointing device, copies the index number of the still image corresponding to the chosen secondary picture form the index memory to the reproducer.

12 Claims, 4 Drawing Sheets

| Disc Identifying Code DSKm | |
|---|---|
| | |
| IMG1 | INX1 |
| IMG2 | INX2 |
| IMG3 | INX3 |
| ⋮ | ⋮ |
| IMGn | INXn |
| ⋮ | ⋮ |

TBLm

IMAGE CONTROL APPARATUS FOR PROVIDING AN INDEX NUMBER TO A VIDEO REPRODUCER TO CAUSE THE REPRODUCER TO SEARCH FOR AND TO REPRODUCE A PRESELECTED STILL IMAGE

BACKGROUND OF THE INVENTION

1. Field of the Invention

The present invention relates generally to image searching apparatus and, more particularly, is directed to an image searching apparatus which can positively search a target picture with ease.

2. Description of the Prior Art

In a video image reproducing system such as a laser disc player, a professional video tape recorder (VTR) and the like, index number (address signal) is of the plurality of still images (one frame) that constitute a motion picture whereby the index number can be input into the reproducing system to search or access the corresponding picture (see Japanese Laid-Open Patent Gazette No. 61-99189).

Generally, in the above-described video image reproducing system, the index number must be inputted thereto by operating the keyboard. However, there is then the substantial disadvantage that the user must remember a picture that the user wishes to see and the index number thereof because the picture that the user wishes to see and the index number are not relevant to each other apparently.

Further, a system has been proposed, in which a bar code of a picture and a bar code of an index number are printed in advance so as to save much time and cumbersome work for operating the keyboard. This proposal needs not only the printed bar code and other related things but also the picture that the user wishes to see can not be coded as the index number.

OBJECTS AND SUMMARY OF THE INVENTION

Accordingly, it is an object of the present invention to provide an improved image search control apparatus which can eliminate the aforenoted shortcomings and disadvantages encountered with the prior art.

More specifically, it is an object of the present invention to provide an image search control apparatus with which the user can positively search a target picture with ease.

It is another object of the present invention to provide an image search control apparatus in which the user needs not remember a target picture and an index number thereof.

It is still another object of the present invention to provide an image search control apparatus which, does not need a printed mark and so on like the above-mentioned bar code system.

It is a further object of the present invention to provide an improved search control apparatus in which only a picture that the user wishes to see can be formed as an index code.

It is yet a further object of the present invention to provide an image search control apparatus which can substantially protect the user from mis-operation.

An image search control apparatus according to the invention provides an index number to a reproducer having a storage medium on which a plurality of still images is stored. The plurality of still images constitutes a motion picture. Each still image is identified by an index number. The reproducer reproduces as a motion picture and provides as a video signal the plurality of still images constituting the motion picture. The video signal includes with each still image the index number of the still image. Alternatively, in response to receiving an index number, the reproducer reproduces and provides as the video signal the still image corresponding to the received index number. The image search control apparatus according to the invention comprises a selector that receives the video signal from, the reproducer and selects from the still images constituting the motion picture a number of selected still images. An index memory stores the selected still images an also stores the index number for each of the selected still images. A display receives the video signal from the reproducer and also receives a number of selected still images from the index memory. The display displays simultaneously on a display screen a moving or still primary picture in response to the video signal from the reproducer, and a number of secondary pictures, each secondary picture being in response one selected still image. A pointing device chooses onto of the secondary pictures and a controller, responsive to the pointing device, reads out from the index memory the index number of the still image corresponding to the chosen secondary picture, and supplies the read out index number to the reproducer.

A method according to the invention is for controlling a reproducer that reproduces a storage medium that stores a plurality of still images. The still images constitute a motion picture. Each still image is identified by an index number. The reproducer normally reproduces the plurality of still images as a motion picture, but, upon receiving the indexed number of a chosen still image, the reproducer searches for and reproduces the chosen still image. In the method according to the invention, an index memory and a display screen are provided. A plurality of still images are reproduced as a motion picture and a number of selected still images are selected from the plurality of still images constituting the motion picture. Each selected still image and the index number for each selected still image is stored in the index memory. A number of the selected still images stored in the index memory are displayed on the display screen and one of the displayed selected still images is chosen. The index number of the chosen still image is copied from the index memory to the reproducer, and the chosen still image reproduced by the reproducer is displayed on the display screen.

BRIEF DESCRIPTION OF THE DRAWINGS

A better understanding of the objects, features and advantages of the invention can be gained from a consideration of the following detailed description of the preferred embodiment thereof, in conjunction with the figures of the accompanying drawings, wherein.

DETAILED DESCRIPTION OF THE PREFERRED EMBODIMENT

Figure 1:
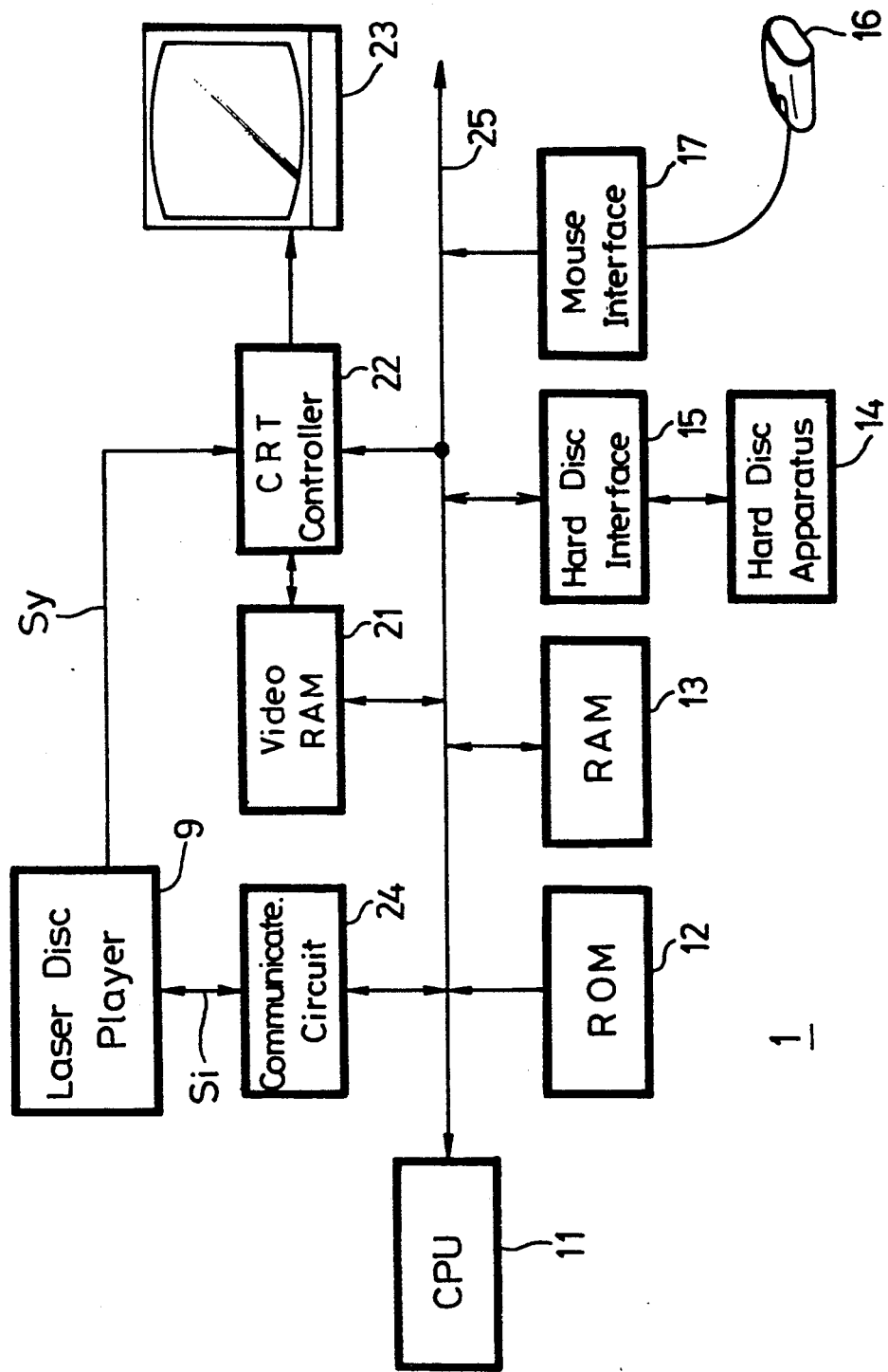
FIG. 1 is a circuit block diagram showing an embodiment of an image search control apparatus according to the present invention.

An embodiment of an image search control apparatus according to the present invention will hereinafter be described with reference to the drawings. In this embodiment, the image search control apparatus is shown connected to a laser disc player motion picture used as a reproducer. The main operation of the image search control apparatus is carried out by using a mouse Referring to FIG. 1, there is shown an image search control apparatus which is generally represented by reference numeral 1. In the irma search control apparatus 1, there are provided a central processing unit (CPU) 11, a read only memory (ROM) 12 in which various programs are written, and a random access memory (RAM) 13 for a working area. The ROM 12 also has stored therein a routine 30 of a flow chart shown in, for example, FIG. 2 (formed of FIGS. 2A and 2B).

Further, in the image search control apparatus 1, there is shown a hard disc apparatus 14 which is connected with a bus line 25 through a hard disc interface 15. A mouse 16 is also connected to the bus line 25 via a mouse interface 17.

Figures 3, 4:
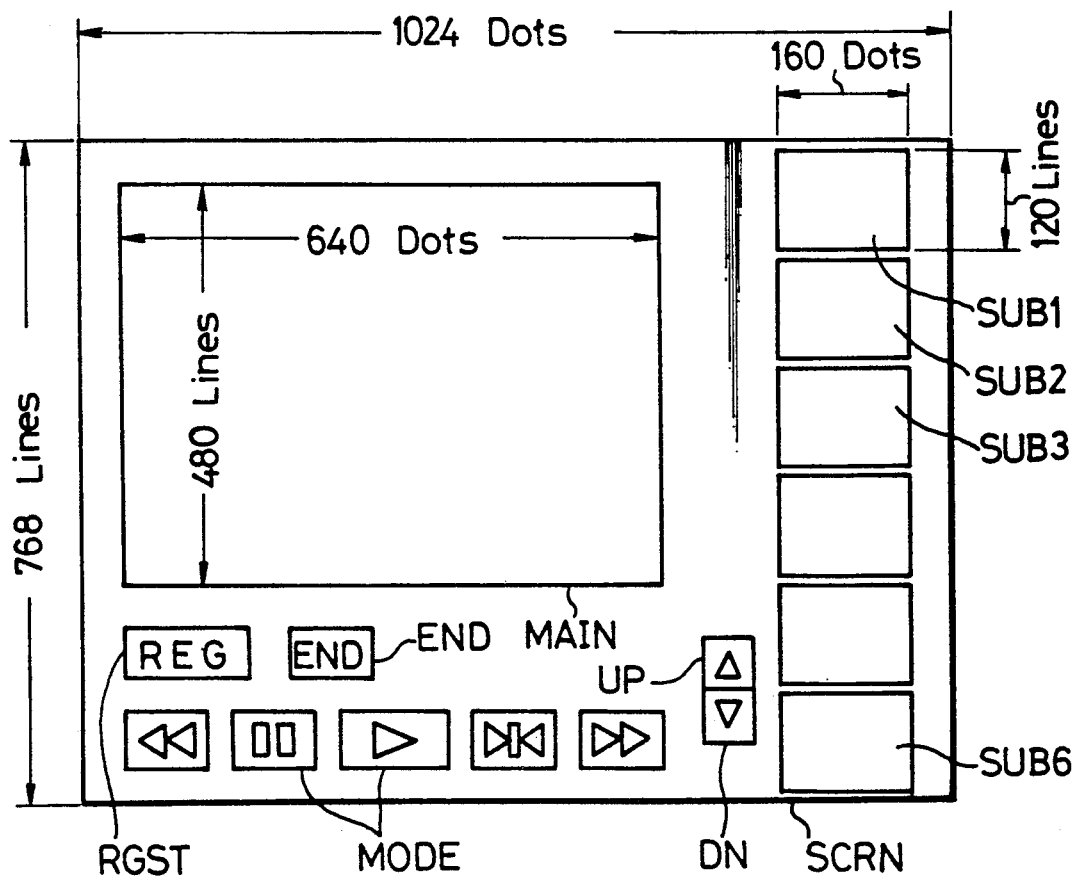
FIG. 3 is a schematic representation of a data table stored in a hard disc apparatus, and to which reference will be made in explaining the operation of the present invention.
FIG. 4 is a front view of an example of a picture displayed on a display apparatus, and to which reference will be made in explaining the present invention.

The hard disc apparatus 14 has stored therein a data table TBLm for each laser disc (not shown) that the user wishes to search. FIG. 3 schematically illustrates the data table TBLm wherein m is one desired number from 1 to the upper limit value determined by the capacity of the hard disc apparatus 14 and m also corresponds with an m'th laser disc. More specifically, as shown in FIG. 3, the table TBLm includes an identifying code DSKm and a corresponding table between the still image data IMGn and index number INXn wherein n is an integer of larger than 1.

The identifying code DSKm is the code that indicates that the table TBLm is for the m'th laser disc. The still image data IMGn is the data that represents the reduced-size image (search key), which the user wishes to search upon during the search. The picture size is reduced to for example, 160 dots (in the horizontal direction) and 120 lines (in the vertical direction). The index number INXn indicates the index number that was assigned to the original still image on the laser disc designated by the still image data IMGn. The pair comprising the still image data IMGn and the index number INXn of the number of still images to be searched upon during the search are stored in the hard disc apparatus 14 as the table TBLm for every laser disc wherein the aforenoted number is the upper limit value of n.

In that case, one still image data IMGn is compressed to about 50 kilo bytes by a data compressing method and the like so that, if the capacity of the hard disc apparatus 14 is selected to be 100 mega bytes, the hard disc apparatus 14 can store therein the still image data IMGn of 2000 laser discs.

Turning, back to FIG. 1, there, is shown a so-called video RAM (V-RAM) 21 that is used in connection with displaying a picture. A cathode ray tube (CRT) controller 22 is provided to control the operation of a CRT display 23, and a communication circuit 24 is constructed in accordance with, for example, RS-232C standard.

FIG. 4 shows an example of the display screen (displayed video image) SCRN displayed on the CRT display 23. The display screen SCRN is capable of displaying a picture of, for example, 1020 dots (in the horizontal direction)×768 lines (in the vertical direction). In the display screen SCRN, the area of 640 dots (in the horizontal direction)×480 lines (in the vertical direction) serves as a main window MAIN and, of the remaining areas, six areas, each being formed by 160 dots (in the horizontal direction)×120 lines (in the vertical direction), serve as sub windows SUB1 to SUB6. The original picture (i.e., original picture of the laser disc) is displayed in the window MAIN and the reduce,,d picture, provided by the still image data IMGn, is displayed in the windows SUB1 to SUB6. Further, the picture screen SCRN displays thereon icons RGST, UP, DN, END used to process the picture and icons MODE used to operate a laser disc player 9 that will be described below.

Referring back to FIG. 1, the laser disc player 9 is controlled to operate in one desired mode in response to a control signal from the communication circuit 24. The laser disc player 9 is also arranged so as to supply the communication circuit 24 with various data signals such as the identifying code DSKm and the like.

Further, the laser disc player 9, can reproduce a video signal Sy representing a still image having a corresponding index number in response to an index number Si input from the communication circuit 24. The video signal Sy reproduced by the laser disc player 9 is supplied through the CRT controller 22 to the CRT display 23.

The video image is registered and searched as follows when the CPU 11 executes the routine 30.

Figure 2A:
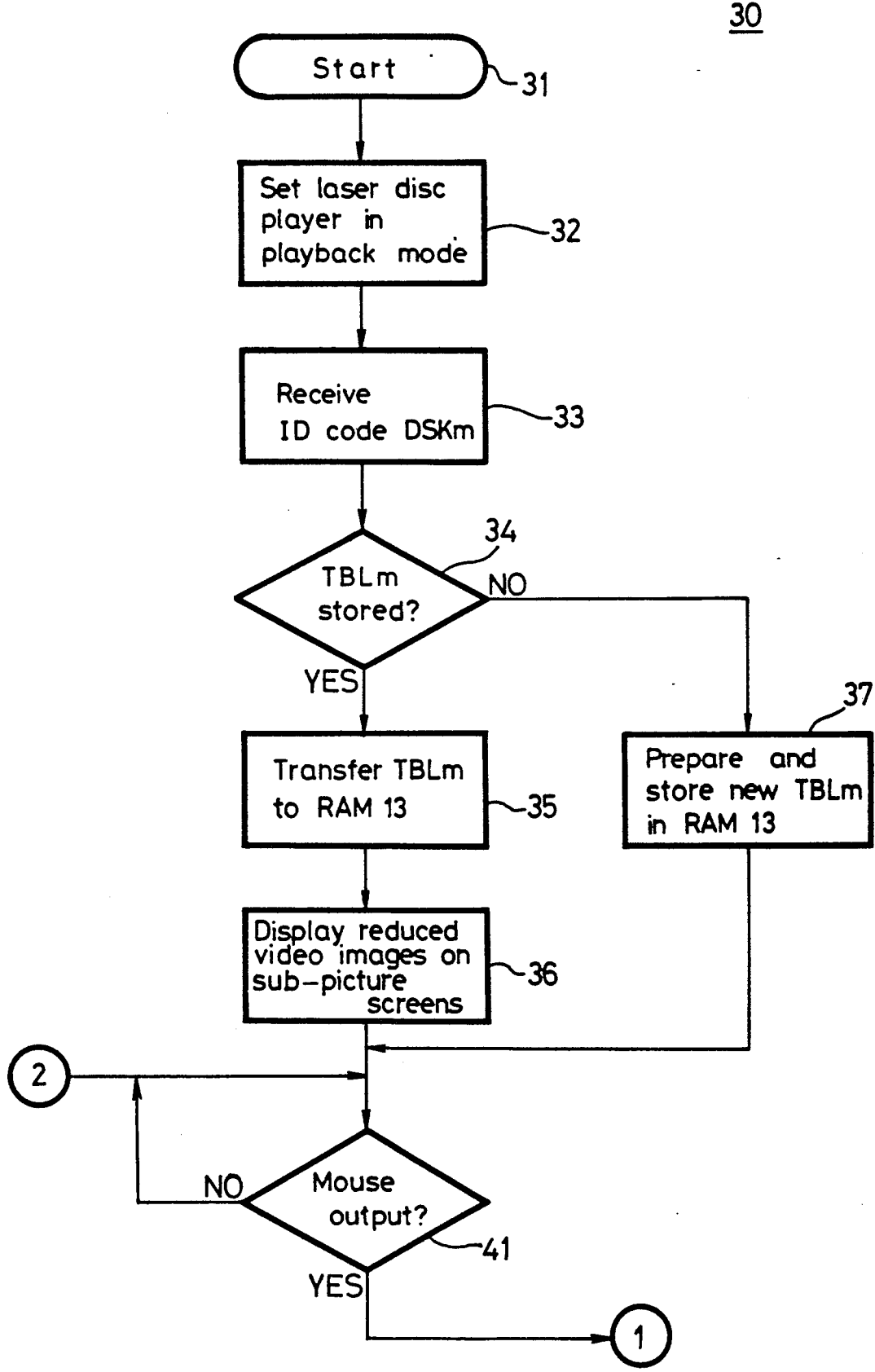
FIG. 2 (formed of FIGS. 2A and 2B drawn on two sheets of drawings to permit the use of a suitably large scale) is a flow chart to which reference will be made in explaining an operation of the present invention.

If the user designates (i.e., clicks) a playback icon from the icons MODE on the picture screen SCRN by using the mouse 16, the processing of the CPU 11 begins with step 31 in the routine 30 as shown in FIG. 2A. The routine goes to step 32, whereat the control signal from the communication circuit 24 is supplied to the laser disc player 9 so that the laser disc player 9 is set in the playback mode to start playing back the laser disc. The reproduced video signal Sy of the laser disc is supplied from the laser disc player 9 through the CRT controller 22 to the CRT display 23. In that case, the reproduced video signal Sy is written in and/or read out from the video RAM 21, and the reproduced video signal Sy is displayed in the main window MAIN of the display screen SCRN of the CRT display 23 as a standard video image. In this way, the motion picture (i.e., a real moving picture in most cases) provided by the laser disc player 9 is continuously displayed in the window MAIN until a particular operation is carried out next.

At that time, the disc identifying code DSKm is reproduced from the disc from which the reproduction just starts, and this disc identifying code DSKm is supplied through the laser disc player 9 to the communication circuit 24. This disc identifying code DSKm is received and identified at step 33, and the processing of the CPU 11 proceeds to the next decision step 34, wherein it is determined whether or not the table TBLm corresponding to the identifying code DSKm is stored in the hard disc apparatus 14.

If the table TBLm is stored in the hard disc apparatus 14, as represented by a YES at step 34, the routine then proceeds from step 34 to step 35. In step 35, the corresponding table TBLm is transferred from the hard disc apparatus 14 through the interface 15 to the RAM 13, and the routine proceeds to step 36. At step 36, of the still image data IMGn of the table TBLm in the RAM 13, first six still image data IMG1 to IMG6 are generated and transferred, to the video RAM 21, whereby reduced video images based on the data IMG1 to IMG6 are displayed on the windows SUB1 to SUB6, respectively. Then, the processing moves to the next decision step 41.

If the table TBLm corresponding to the identifying code DSKm is not stored in the hard disc apparatus 14, as represented by a NO at step 34, then the routine proceeds from step 34 to step 37, whereat a new table TBLm is prepared in the RAM 13. Then, the routine proceeds to the next decision step 41. In that case, the processing at step 36 is not carried out so that nothing is displayed in the windows SUB1 to SUB6.

In step 41, it is determined whether or not the mouse 16 generates an output. If a NO is outputted at step 41, the routine then returns to step 41 until the mouse 16 generates its output.

Figure 2B:
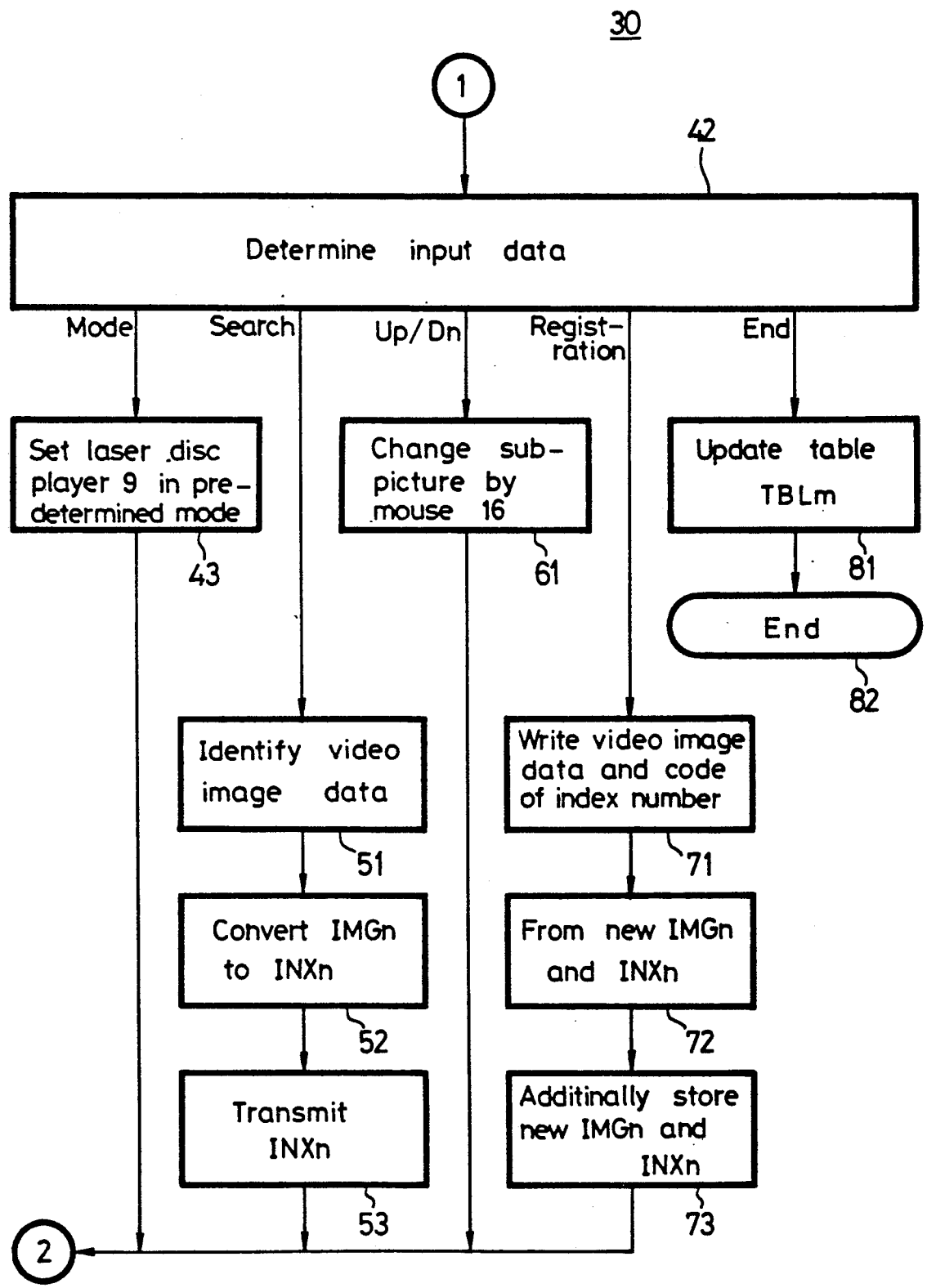

If the mouse 16 generates an output, as represented by a YES at step 41, then the routine proceeds from step 41 to step 42 as shown in FIG. 2B. In step 42, it is determined which one of the icons RGST, UP, DN, END, MODE of the screen SCRN and the sub windows SUB1 to SUB6 the output of the mouse 16 clicks. If the mouse 16 clicks the icon MODE, the processing of the CPU 11 proceeds from step 42 to step 43, whereat the control signal is supplied through the communication circuit 24 to the laser disc player 9, whereby the laser disc player 9 is placed in the operation mode corresponding to the icon MODE clicked by the mouse 16, for example, the laser disc player 9 is set in the frame picture mode, pause mode, fast forward mode or the like. Then, the processing of the CPU 11 returns to step 41.

Accordingly, if the icon MODE is clicked by the mouse 16, then the laser disc player 9 can be set in the desired mode so that a target reproduced picture can be displayed on the window MAIN of the picture screen SCRN.

If it is determined in step 42 that the mouse 16 clicks one of the windows SUB1 to SUB6 at step 41, then the routine proceeds from step 42 to step 51. At step 51, the still image data IMGn in the window clicked by the mouse 16 is identified, and the routine proceeds, to the next step 52, whereat the index number INXn corresponding to the chosen still image data IMGn determined from the table TBLm.

In the next step 53, the determined index number INXn is supplied through the communication circuit 24 to the laser disc player 9, with the result that the laser disc player 9 searches the picture having the index number indicated by the index number INXn on the basis of the index number INXn thus supplied thereto. If the corresponding picture is searched out, then the laser disc player 9 is placed in the reproduction mode from the searched picture.

Accordingly, if the reduced still images displayed in the windows SUB1 are chosen by using the mouse 16, then the picture search is carried out on the laser disc by using the reduced still image as a search key. If the picture that the user wishes to see is found, the reproduced video signal Sy of the laser disc, is displayed in the main window MAIN of the display screen as a still image.

The processing of the CPU 11 returns from step 53 to step 41, whereat the CPU 11 awaits the next command that the user issues by using the mouse 16.

Further, if it is determined at step 42 that the mouse 16 clicks the icon UP or DN in step 41, then the processing of the CPU 11 proceeds from step 42 to step 61. If in step 61 the mouse 16 clicks the icon UP, then the RAM 13 derives the next six still image data IMG7 to IMG12 succeeding to the still image data IMG1 to IMG6. The still image data IMG7 to IMG12 are transferred to the still RAM 21, whereby the reduced video images based in the data IMG7 to IMG12 are displayed on the windows SUB1 to SUB6, respectively. In this way, in response to the icon UP or DN clicked by the mouse 16, the still image data succeeding to the still image data of reduced still images now displayed in the windows SUB1 to SUB6 are generated from the RAM 13 6 by 6 (or, if the number of data is less than 6, by that number each) and transferred to the video RAM 21, whereby the reduced still images succeeding to the reduced still images displayed at present in the windows SUB1 to SUB6 are displayed in the windows SUB1 to SUB6, respectively. Then, the routine returns to step 41.

Accordingly, each time the, icon UP or DN is, clicked by the mouse 16, the reduced still images displayed in the windows SUB1 to SUB6 as the search keys are sequentially updated in response to the still image data IMGn of the table TBLm.

In that case, if the reduced still images displayed in the windows SUB1 to SUB6 are selected by the mouse 16, then the picture search is carried out on the laser disc, whereby the still image of the reduced still image designated by the mouse 16 is displayed in the main picture screen window MAIN.

If it is determined at step 42 that the mouse 16 clicks the icon RGST in step 41, then the routine, proceeds from step 42 to step 71. In step 71, the still image data of the one selected still image of the reproduced video signal Sy at that time and the corresponding index number of the selected still image are written in the RAMs 21 and 13. In the next step 72, new still irma data IMGn of the reduced still image is formed from the still image data of the selected still image.

In the next step 73, the new still image data IMGn index number INXn written in RAM at step 71 are additionally stored in the table TBLm of the RAM 13. Thereafter, the processing of the CPU 11 returns to step 41.

Therefore, each time the icon RGST is clicked by the mouse 16, the still image data IMGn, which results from reducing the still image displayed in the main picture screen window MAIN at that time, and the index number INXn corresponding to the selected still image, are additionally registered in the table TBLm.

Further, if it is determined at step 42 that the icon END is clicked by the mouse 16 in step 41, the processing of the CPU 11 proceeds from step 42 to step 81, whereat the table TBLm stored in the RAM 13 is supplied to the hard disc apparatus 14, resulting in the table TBLm within the hard disc apparatus 14 being updated. The routine 30 ends with step 82.

As set out above, according to the present invention, the table TBLm in which the still image data IMGn of the reduced still image and the index number INXn are stored in prepared for each laser disc so that, when the target still image is searched for, if the reduced still image is designate as the search key, the index number INXn corresponding to the reduced still image is determined and the target still image is searched with ease and it is not necessary for the user to remember the target still image and the index number thereof.

According to the present invention the printed elements are not needed unlike the bar code system and in addition, only the still image that the user wishes to search can be formed as the index.

Further, since the reduced still images displayed on the windows SUB1 to SUB6 are supported, the number of the required, mis-operation can be substantialy avoided. Also, since much more still image data IMGn than the number of windows SUB1 to SUB6 are supported, the number of the reduced still images which from the search keys is not limited.

In the foregoing, the operation of the laser disc player 9 (i.e., corresponds with the processing at step 43) may be carried out by operation keys provided in the player body or by a remote controller when the still image data IMGn is deleted, the corresponding still image data IMGn and the index number INXn thereof may be deleted from the table TBLm by clicking the reduced still images displayed in the windows SUB1 to SUB6 similarly to the search mode.

Furthermore, by clicking the window SUB1 to SUB6 by the mouse 16, the location of the reused still image (i.e., sequential order of the reduced still image) may be designated when the search reduced still images are registered in the table TBLm.

In addition, th hard disc apparatus 14 and the mouse 16 may be replaced with or added with a magneto-optical disc apparatus and a keyboard.

Having described a preferred embodiment of the invention with reference to the accompanying drawings, it is to be understood that the invention is not limited to that precise embodiment and that various changes and modifications could be effected by one skilled in the art without departing om the spirit or scope of the novel concepts of the invention as defined n the appended claims.

We claim as our invention:

1. An image search control apparatus for providing an index number to a reproducer having a storage medium on which a plurality of still images is stored, the plurality of still images constituting a motion picture, each still image being identified by an index number, the reproducer reproducing as a motion picture and providing as a video signal the plurality of still images constituting the motion picture, the video signal including with each still image the index number of the still image, the reproducer alternatively reproducing and providing as the video signal, in response to receiving an index number, the still image corresponding to the received index number, the apparatus comprising:

selecting means for receiving the video signal from the reproducer and for selecting from the plurality of still images constituting the motion picture a number of selected still images and the index number of each of the selected still images;

index memory means for storing each of the selected still images together with its index number;

display means for receiving the video signal from the reproducer, for receiving a number of selected still images from the index memory means, and for displaying simultaneously on a display screen a moving or still primary picture in response to the video signal from the reproducer, and a number of secondary pictures, each secondary picture being in response one selected still image;

pointing means for choosing the one of the secondary pictures; and control means, responsive to the pointing means, for reading out from the index memory means th index number of the still image corresponding of the chosen secondary picture, and for providing the read out index number to the reproducer.

2. An image search control apparatus according to claim 1, wherein the display screen includes a main window area in which the primary picture is displayed and a sub window in v/hich a secondary picture is displayed.

3. An image search control apparatus according to claim 2, wherein the display screen includes a plurality of sub windows.

4. An imag search control apparatus according to claim 2, wherein the pointing means moves a cursor on the display screen to choose the desired secondary picture.

5. An image search control apparatus according to claim 1, wherein
   the mechanical operation of the reproducer is remotely controlled,
   the display screen additionally displays a number of reproducer move icons on the picture screen
   the pointing means is additionally for choosing a reproducer mode icon, and
   the control means i additionally for remotely controlling the mechanical operation of the reproducer in response to the chosen reproducer mode icon.

6. An image search control apparatus according to claim 1, wherein the selected still images and the index number for each of the selected still images are stored in the index memory means as an index table.

7. An image search control apparatus according to claim 2, wherein
   the display means is additionally for displaying a registration icon on the display screen,
   the pointing means includes an clavicle switch, and is additionally for choosing the registration icon,
   the control means is additionally for generating a registration control signal in response to the registration icon being chosen and the switch being clicked, and
   the selecting means selects from the still images constituting the motion picture the still image displayed n the main window at the moment that the switch is clicked in response to the registration control signal.

8. An image search control apparatus according to claim 1, wherein the index memory means stores the selected still images as reduced still images.

9. A method of controlling a reproducer that reproduces a storage medium that stores a plurality of still images, the still images constituting a motion picture, each still image being identified by an index number, the reproducer reproducing the plurality of still images as a motion picture, or, upon receiving the index number of a chosen still image, reproducing the chosen still image, the method comprising:
   providing an index memory and a display screen;
   reproducing the plurality of still images as a motion picture;
   selecting from the plurality of still images constituting the motion picture a number of selected still images and the index number for each of the selected still images;

storing each selected still image together with its index number in the index memory;

displaying a number of the selected still images stored in the index memory on the display screen;

choosing one of the displayed selected still images;

copying the index number of the chosen still image from the index memory to the reproducer; and displaying on the display screen the chosen still image reproduced by the reproducer.

10. The method of claim 9, further comprising providing a primary picture area and a secondary picture area on the display screen, and wherein the step of reproducing the plurality of still images as a motion picture includes displaying the plurality of still images as a motion picture in the primary picture area, and the step of displaying a number of the selected still images stored in the index memory on the display screen includes displaying the selected still images in the secondary picture area.

11. The method of claim 9, wherein the step of choosing one of the displayed selected still images includes displaying a cursor on the display screen, and moving the cursor into contact with the displayed selected still image to be chosen.

12. The method of claim 9, wherein the step of selecting from the plurality of still images constituting the motion picture a number of selected still images and the index number for each of the selected still images includes displaying a registration icon on the display screen, displaying a cursor on the display screen, moving the cursor into contact with the registration icon.

* * * * *